US012645193B2

(12) United States Patent
Süss

(10) Patent No.: US 12,645,193 B2
(45) Date of Patent: Jun. 2, 2026

(54) DATA PROVISION APPARATUS

(71) Applicant: SICK AG, Waldkirch (DE)

(72) Inventor: Sebastian Süss, Waldkirch (DE)

(73) Assignee: SICK AG, Waldkirch (DE)

( * ) Notice: Subject to any disclaimer, the term of this patent is extended or adjusted under 35 U.S.C. 154(b) by 433 days.

(21) Appl. No.: 18/221,979

(22) Filed: Jul. 14, 2023

(65) Prior Publication Data

US 2024/0027987 A1    Jan. 25, 2024

(30) Foreign Application Priority Data

Jul. 21, 2022    (DE) .......................... 102022118215.0

(51) Int. Cl.
G05B 19/402    (2006.01)

(52) U.S. Cl.
CPC .. G05B 19/402 (2013.01); G05B 2219/33155 (2013.01)

(58) Field of Classification Search
CPC .............. G05B 19/0425; G05B 19/402; G05B 2219/33155; G05B 11/00; G05B 15/00; G05B 19/00; G05B 6/00; G05B 2219/00
See application file for complete search history.

(56) References Cited

U.S. PATENT DOCUMENTS

| | | | | | |
|---|---|---|---|---|---|
| 4,535,277 | A | * | 8/1985 | Kurakake | .............. G05B 19/39 |
| | | | | | 318/660 |
| 5,194,790 | A | * | 3/1993 | Niimi | ..................... G05B 19/41 |
| | | | | | 318/567 |

| | | | | | |
|---|---|---|---|---|---|
| 2009/0039875 | A1 | * | 2/2009 | Hoshino | ................ G01D 5/145 |
| | | | | | 324/207.21 |
| 2014/0126677 | A1 | * | 5/2014 | Fritsch | ................... G01D 21/02 |
| | | | | | 375/362 |

(Continued)

FOREIGN PATENT DOCUMENTS

| | | | | |
|---|---|---|---|---|
| DE | 102012215215 A1 | | 3/2013 | |
| DE | 102012201170 A1 | | 8/2013 | |
| DE | 102016212115 A1 | * | 1/2018 | .......... G05B 19/054 |

(Continued)

OTHER PUBLICATIONS

Office Action dated Jul. 21, 2023 issued in corresponding German Application No. 102022118215.0.

(Continued)

*Primary Examiner* — Kidest Worku
(74) *Attorney, Agent, or Firm* — Nath, Goldberg & Meyer; Jerald L. Meyer

(57)    ABSTRACT

A data provision apparatus for providing position data and additional data to a higher-ranking unit comprises a signal preparation unit that is configured to receive position data and to receive additional data, to combine the position data and the additional data with one another for a joint data transmission and to subsequently output them in a combined form. In this respect, the data provision apparatus further comprises a signal processing unit that is configured to receive position data from a position detection apparatus and to receive additional data from an additional data acquisition apparatus, to bring the additional data into a defined relationship, preferably a temporal relationship, with the position data and to subsequently output at least the additional data to the signal preparation unit.

20 Claims, 2 Drawing Sheets

(56) References Cited

U.S. PATENT DOCUMENTS

2014/0320310 A1* 10/2014 Steinhardt .............. G01S 19/47
340/870.07

FOREIGN PATENT DOCUMENTS

EP       1597714  B1    12/2016
EP       3267272  B1     6/2020

OTHER PUBLICATIONS

Office Action dated Apr. 20, 2023 issued in corresponding German Application No. 102022118215.0.
Search Report for corresponding European application 23182269.3EP, dated Dec. 12, 2023.
Huber et al., "Temporal Calibration in Multisensor Tracking Set-ups", IEEE International Symposium on Mixed and Augmented Reality 2009, Science and Technology Proceedings, Oct. 19-22, Orlando, FL, USA, 978-1-4244-5419-8/09$25.00, pp. 195-196 (C)2009, ICCC.

* cited by examiner

DATA PROVISION APPARATUS

The invention relates to a data provision apparatus for providing position data and additional data to a higher-ranking unit.

It is known for various applications to acquire position data about the respective position of a movable element by means of a position detection apparatus. For example, this can be the position of a motor. Depending on the type of motor, it can, for instance, be a linear position or a rotary position of the motor. Acquired position data can in particular be considered when controlling the motor. If the control of the motor is designed as a closed-loop control, the position data can represent a feedback variable of the closed-loop control. Said higher-ranking unit can, for example, be a motor control or a closed-loop motor control. Position data are in this respect not limited to information about the current position of the respective element, but can additionally or alternatively comprise information about position changes, in particular about the speed, of the respective element.

In addition to position data, other information can also be important, for instance for the operation of a motor. Therefore, depending on the application, it can be expedient to acquire additional data in addition to the position data. These additional data can, for example, be vibration data or temperature data of the respective motor that are acquired in parallel with the acquisition of the position data of the motor. Such additional data can, for example, serve to detect errors in the adjustment, indications of wear or other potential disturbances of a regular operation of the motor as early as possible. Furthermore, the additional data, just like the position data, can be included in a control, in particular a closed-loop control, of the motor.

Since the acquisition of position data, on the one hand, and the acquisition of additional data, such as vibration data or temperature data, on the other hand, are usually based on different measuring principles, different acquisition apparatus, whose data are transmitted to the higher-ranking unit, are usually provided for the acquisition of position data and the acquisition of additional data. So that the higher-ranking unit does not have to have corresponding connection options for each detection apparatus, it can be expedient in this respect to provide a data provision apparatus in which the position data and the additional data are compiled and from which these data are then transmitted together, in particular via a single connection, to the respective higher-ranking unit. Such a data provision apparatus is, for example, described in EP 1 597 714 B1.

Typically, not only does the acquisition of the position data and the acquisition of the additional data in the various acquisition apparatus generally take place independently of one another in this respect, but the position data and additional data transmitted to the respective higher-ranking unit are also not dependent on one another. For example, due to the different measuring principles, the position data and the additional data are acquired with different sampling frequencies and/or with a temporal offset from one another that is possibly not precisely known. Provision can indeed be made that the position data and the additional data are combined with one another for the joint transmission to the higher-ranking unit, as is the case in the aforementioned EP 1 597 714 B1. However, the mutually combined data can have been acquired at very different points in time. For example, provision can be made that the position data are acquired with a comparatively high sampling frequency, whereas the additional data are acquired with a lower sampling frequency. Furthermore, provision can be made that some acquired data, in particular the additional data, are buffered and are transmitted with a time delay and/or in a collected form, while other acquired data, in particular the position data, are transmitted continuously directly after the acquisition.

Therefore, from the transmission of mutually combined position and additional data, it can at most be inferred that the combined position and additional data were acquired at an approximately similar point in time. However, the data combined in this way do not have a precisely defined relationship with one another due to the mutually independent acquisition in the different acquisition apparatus.

Depending on the type of additional data, additional difficulties can arise. For example, vibration data can indeed be sampled and transmitted at fixed time intervals in the case of motors with a constant rotational speed. In contrast, this is usually not practical for motors that are operated at different rotational speeds, such as for servo motors, since the vibration correlates strongly with the respective rotational speed of the motor. The analysis of vibration data that are acquired at different motor speeds is thereby much more difficult. Occasionally, attempts are made to derive the respective rotational speed from the vibration spectrum.

Alternatively thereto, it is known to briefly operate the motor at constant rotational speeds for the acquisition of the vibration data. The position detection, on the other hand, is not affected by such difficulties and can therefore be carried out completely independently in the meantime. In turn, the data that are then transmitted in a combined form to the higher-ranking unit do not have a precisely defined relationship with one another.

So that the higher-ranking unit can consider the received position and additional data together, for example for a closed-loop control, it is therefore common for the position and additional data to be subsequently offset in the higher-ranking unit such that they are thereby brought into a relationship with one another. This can, for example, take place by a simple interpolation or extrapolation or a combination thereof. However, more complex procedures can also be required to ensure a desired reliability. The offsetting of the position and additional data against one another can in particular be made more difficult due to jitter and/or due to different time bases during the respective sampling as well as during the transmission of the data and can thereby be quite complex overall.

It is an object of the invention to provide a data provision apparatus that avoids these disadvantages and that in particular contributes towards the position and additional data provided to the higher-ranking unit substantially being able to be used directly by the higher-ranking unit, for example for a control or closed-loop control.

The object is satisfied by a data provision apparatus having the features of claim 1 and by methods for providing position data and additional data to a higher-ranking unit in accordance with claims 15 to 17. Advantageous further developments of the invention can be seen from the dependent claims, the present description, and the Figures.

The data provision apparatus in accordance with the invention serves to provide position data and additional data to a higher-ranking unit. As already explained, the position data and the additional data can in particular be data that are both acquired by the same movable element, for example a motor. The data provision apparatus can, for example, be an encoder feedback system or a motor feedback system or a component of such a system. The higher-ranking unit can, for example, be a control, in particular a closed-loop control, for the motor whose position and additional data are acquired. The unit is higher-ranking in that it receives the data—possibly after it has requested them—from the data provision apparatus and then uses them, while the data provision apparatus is only an intermediate link between the acquisition and the use of the data.

The data provision apparatus comprises a signal preparation unit that is configured to receive position data and to receive additional data, to combine the position data and the additional data with one another for a joint data transmission and to subsequently output them in a combined form so that they can be transmitted via a single connection to the higher-ranking unit. The joint data transmission can, for example, take place by means of a suitable serial protocol.

The data transmission can also comprise transmitting the data as data packets that each comprise both position data and additional data. The mutually combined position and additional data are preferably output directly to the higher-ranking unit by the signal preparation unit.

When it is mentioned here and in the following that the data provision apparatus, the signal preparation unit or another element of the data provision apparatus is configured to do something, this does not only mean a general, merely theoretical possibility, but rather a specific technical design such that what the data provision apparatus or the respective element is in each case configured to do is also actually implemented by the respective element during the regular operation of the data provision apparatus.

In accordance with the invention, the data provision apparatus further comprises a signal processing unit that is configured to receive position data from a position detection apparatus and to receive additional data from an additional data acquisition apparatus, to bring the additional data into a defined relationship, preferably a temporal relationship, with the position data and to subsequently output at least the additional data to the signal preparation unit. The signal processing unit preferably also outputs the position data to the signal preparation unit. In general, the signal processing unit can, however, also receive the position data directly from the position detection apparatus.

Due to the design in accordance with the invention, the signal processing unit is therefore provided between the acquisition apparatus (position detection apparatus and additional data acquisition apparatus), from which it receives acquired position and additional data, and the signal preparation unit to which it outputs at least the additional data and preferably also the position data. In this respect, it is essential that the position and additional data have already been brought into a defined relationship with one another at this point, i.e. even before they are combined by the signal preparation unit for the joint data transmission to the higher-ranking unit.

This defined relationship can in particular be a temporal relationship, i.e. it is then unambiguously and reliably defined for a set of position data and additional data in which temporal relationship they are to one another. This can, for example, comprise that the position data and additional data output in a combined form are of such a kind that they relate to a point in time that is identical within the scope of the detection accuracy, or also that the point in time to which the position data refer and the point in time to which the additional data refer differ from one another by a defined time difference, preferably always the same time difference.

However, the defined relationship can also be a position-based relationship. Such a relationship can in particular be present in that the additional data are not output in relation to a specific point in time of the data acquisition, but are output in relation to a specific position which the movable element (e.g. a motor) had at the point in time of the data acquisition. The fact that the signal processing unit brings the additional data into the defined relationship with the position data can in this respect also consist of contributing towards the additional data already being collected in a precisely defined relationship, preferably a temporal relationship, with the position data, as will be explained further below.

Regardless of the type of defined relationship into which the additional data are brought relative to the position data, this preprocessing of the additional data by the signal processing unit can be regarded as a type of standardization of the additional data with respect to the position data, by which standardization it is ensured that the higher-ranking unit receives position data and additional data that can be used directly without further processing, for example for controlling the motor.

Both the position detection apparatus and the additional data acquisition apparatus can in this respect be integrated into the data provision apparatus, i.e. configured as a respective component of the data provision apparatus.

Alternatively thereto, the position detection apparatus and/or the additional data acquisition apparatus can each also be configured as a unit that is separate and independent from the data provision apparatus.

In accordance with an advantageous embodiment, the signal processing unit is configured to bring the position data into a defined relationship, preferably a temporal relationship, with the additional data and to subsequently output the position data to the signal preparation unit. In other words, in this embodiment, provision can be made that, in order to bring about the defined relationship between the position data and the additional data, not only are the additional data adapted to the position data, but, conversely, the position data are also adapted to the additional data. It can generally also be considered that only the position data are brought into a defined relationship with the additional data, while the signal processing unit outputs the additional data received from the additional data acquisition apparatus at least substantially unchanged to the signal preparation unit. Preferably, it is, however, exactly the other way around since the position data are typically the more time-critical data and the more important data, for instance for the control or closed-loop control of a motor.

In accordance with a further advantageous embodiment, the signal processing unit is configured to bring the additional data into a defined relationship with the received position data in that the signal processing unit offsets the received position data and additional data against one another, preferably in that the signal processing unit calculates additional data standardized on the basis of the position data. Therefore, the additional data that are offset or standardized in this way are then output to the signal preparation unit, while the acquired position data are preferably output unchanged to the signal preparation unit. In such an embodiment, the correlation of the additional data to the position data therefore takes place by calculation within the signal processing unit. The offsetting can, for example, comprise an interpolation by which, for a point in time to which respective position data refer but for which no additional data referring to this point in time are directly available, standardized additional data are calculated from additional data that refer to one or more earlier and/or later points in time.

The calculation of additional data standardized on the basis of the position data can, for example, take place in that for a point in time at which position data, but no additional data, were acquired, additional data are determined by calculation in that they are extrapolated from previously acquired additional data (i.e. additional data that were acquired before this point in time)—preferably at least from the additional data acquired last before this point in time—and, if necessary, from a known relationship of these additional data with previously acquired position data—preferably with at least the position data acquired last before this point in time. For this purpose, provision can, for example, be made that both position data and additional data, including their temporal offset from one another, are buffered; based on these buffered data, respective interpolated position data can then be determined by interpolation between the acquired position data for the points in time at which additional data have been acquired. Based on this data set (previously acquired position and additional data as well as interpolated position data), corresponding additional data can then be determined by extrapolation for position data newly acquired at a specific point in time. Alternatively or in addition to such an extrapolation, an interpolation (or even a correction of the extrapolation) can also take place as soon as the next additional data are acquired. Furthermore, it is conceivable that the newly acquired additional data are combined with the interpolated position data and are then transmitted together with them.

In addition to such a computational processing of the additional data on the basis of the position data, there are, however, even further possibilities of bringing the additional data into a defined relationship with the position data, namely in particular by already bringing about a dependence on the position data for the acquisition of the additional data. This is illustrated by the following embodiments.

In accordance with an advantageous embodiment, the signal processing unit is configured to generate a common trigger signal, preferably a time-based trigger signal, for the acquisition of position data and the acquisition of additional data and to output said common trigger signal in a synchronized manner to the position detection apparatus and to the additional data acquisition apparatus. The sampling of a single position data value or a single additional data value or of a sequence of position data values or additional data values can, for example, be triggered by the trigger signal. In this embodiment, the additional data are thereby brought into a defined relationship with the received position data in that the signal processing unit generates the common trigger signal and outputs it in a synchronized manner to the position detection apparatus and the additional data acquisition apparatus. The output can in particular be synchronized in that the common trigger signal is output simultaneously or with a defined time offset to the position detection apparatus and to the additional data acquisition apparatus.

The synchronized output of the common trigger signal serves to trigger an acquisition of position data in the position detection apparatus and, in a defined temporal relationship thereto, to trigger an acquisition of additional data in the additional data acquisition apparatus, wherein the signal processing unit subsequently receives both the acquired position data and the acquired additional data. The received additional data then ideally do not have to be further offset against the position data by the signal processing unit since they have already been brought into a temporal relationship with the position data by the signal processing unit by way of the common trigger signal. However, it is also not ruled out that they are also additionally offset against the position data. Such an offsetting can, for example, be expedient for compensating different signal propagation times, different durations of the respective sampling, and/or a known temporal offset.

The signal processing unit can in particular be configured to generate the common trigger signal cyclically, i.e. at regular time intervals. In general, as an alternative or in addition to a cyclical generation of the common trigger signal, provision can also be made that the signal processing unit generates the common trigger signal in response to an external request, for example from the higher-ranking unit. If the common trigger signal is generated as a result of an external request, it can also be generated by the signal preparation unit or by a communication interface, via which the data provision apparatus can be connected to the higher-ranking unit, instead of by the signal processing unit. Furthermore, the generation of a trigger signal can generally also be dependent on acquired data, for example on other additional data and/or on the position data.

In accordance with an advantageous embodiment, the signal processing unit is configured to generate a position-based trigger signal in dependence on the received position data and to output it to the additional data acquisition apparatus. In this embodiment, the additional data are therefore brought into a defined relationship with the received position data in that the signal processing unit generates and outputs the position-based trigger signal. The trigger signal can in particular be position-based in that it is generated and output precisely whenever the element whose position is being detected reaches a specific position, which is determined based on the acquired position data. The output position-based trigger signal can then, in the additional data acquisition apparatus, trigger the acquisition of additional data (i.e. the sampling of one or more additional data values) which the signal processing unit subsequently receives.

Since the acquisition of the additional data in such an embodiment depends on reaching the specific position, the additional data in this case are brought into a defined relationship with the position data by means of the position-based trigger signal from the signal processing unit. At least indirectly, this is also a temporal relationship since it is known or can at least be inferred based on the position data at what point in time the specific position, on whose reaching the position-based trigger signal was generated and output, was present. Similarly to the common trigger signal, the additional data acquired as a result of a position-based trigger signal ideally do not have to be further offset against the position data. An offsetting can nevertheless be expedient, for example, to convert the indirect temporal relationship into a direct temporal relationship of the additional data with the position data.

In a further advantageous embodiment, the signal processing unit is configured to receive a position-based trigger signal from the position detection apparatus and to output it to the additional data acquisition apparatus. In this respect, the signal processing unit can in particular forward the received position-based trigger signal directly to the additional data acquisition apparatus. Unlike in the preceding embodiment, the position-based trigger signal is not generated by the signal processing unit itself in the present embodiment. Instead, the additional data are brought into a defined relationship with the received position data by the signal processing unit in that the signal processing unit receives the position-based trigger signal from the position detection apparatus and subsequently outputs it to the additional data acquisition apparatus to trigger an acquisition of additional data there. As in the preceding embodiment, the signal processing unit then receives, from the additional data acquisition apparatus, the additional data acquired in this way that ideally do not have to be further offset against the position data since they already have a defined relationship with the position data as a result of the position-based trigger signal. However, a further offsetting of the additional data is also not excluded.

In this context, it can be expedient if the data provision apparatus also comprises the position detection apparatus and the position detection apparatus is configured to generate the position-based trigger signal and to output it to the signal processing unit. Provision can in particular be made that the position detection apparatus generates the position-based trigger signal and outputs it to the signal processing unit whenever the element whose position is detected reaches a specific position. This can in particular be determined based on the position data acquired by the position detection apparatus. The acquisition of the position data can in turn be triggered by an additional trigger signal that is, for example, generated cyclically or as a result of a request of the higher-ranking unit, for example, by the signal processing unit and is output to the position detection apparatus.

In accordance with a further advantageous embodiment, the data provision apparatus comprises the position detection apparatus and the position detection apparatus is configured to generate a position-based trigger signal and to output it, preferably directly, to the additional data acquisition apparatus. This embodiment differs from the preceding embodiment in that the position-based trigger signal generated by the position detection apparatus does not reach the additional data acquisition apparatus via the signal processing unit, but preferably by a direct route. The contribution of the signal processing unit towards bringing the additional data acquired as a result of the trigger signal into a defined relationship with the position data can in this respect consist of correlating the position data received from the position detection apparatus and the additional data received from the additional data acquisition apparatus via the specific position on whose reaching the position-based trigger signal was generated and output.

In accordance with a further advantageous embodiment, the data provision apparatus is configured to be selectively operated in a first operating mode, in which time-based trigger signals are generated and are output in a synchronized manner to the position detection apparatus and the additional data acquisition apparatus (preferably by the signal processing unit), or in a second operating mode in which position-based trigger signals are generated in dependence on the position data and output to the additional data acquisition apparatus (preferably by the signal processing unit or by the process detection apparatus). In this respect, the trigger signals in each case serve to trigger the acquisition of position data or of additional data in the position detection apparatus or the additional data acquisition apparatus. The position and additional data acquired in this way can then be received by the signal processing unit. In this respect, the additional data already have a defined relationship with the position data due to the respective trigger signal. In the signal processing unit, the additional data can, however, also be even further offset based on the position data.

In accordance with an advantageous further development of the preceding embodiment, the data provision apparatus is configured such that a switch is automatically made between the first and the second operating mode in dependence on acquired position data. It is in particular possible to switch automatically between the first and the second operating mode in dependence on a speed derived from the position data. For example, it can be expedient to operate the data provision apparatus at speeds below a certain threshold value in the first operating mode with the time-based trigger signals and at speeds above the threshold value in the second operating mode with the position-based trigger signals.

In accordance with a further advantageous embodiment, the data provision apparatus comprises the additional data acquisition apparatus, wherein the additional data acquisition apparatus is configured to acquire vibration data, ultrasound data and/or temperature data as additional data and to output them to the signal processing unit. Such data can be specifically expedient for monitoring a motor with regard to a disturbance-free operation.

In accordance with an alternative advantageous embodiment, the data provision apparatus comprises the additional data acquisition apparatus, wherein the additional data acquisition apparatus is configured to read memory values from a memory of the additional data acquisition apparatus as additional data and to output them to the signal processing unit. In this case, the acquisition of additional data therefore corresponds to a kind of lookup of stored information.

In general, the data provision apparatus can also cooperate with more than only one additional data acquisition apparatus or can comprise more than only one additional data acquisition apparatus, wherein the additional data acquisition apparatus do not necessarily have to be of the same design. For example, one of the additional data acquisition apparatus can be configured to acquire vibration data, ultrasound data and/or temperature data as additional data and to output them to the signal processing unit and another one can be configured to read memory values from a memory of the additional data acquisition apparatus as additional data and to output them to the signal processing unit.

In accordance with a further advantageous embodiment, the data provision apparatus further comprises a communication interface that can be connected to a communication interface of the higher-ranking unit and that is configured to receive the combined position and additional data from the signal preparation unit and to transmit them to the higher-ranking unit.

In accordance with one embodiment, the method in accordance with the invention can comprise the following steps: acquiring position data by means of a position detection apparatus; acquiring additional data by means of an additional data acquisition apparatus; calculating the additional data in dependence on the position data by means of a signal processing unit such that the additional data have a defined relationship, preferably a temporal, relationship, with the position data; combining the position data and the (calculated) additional data for a joint data transmission by means of a signal preparation unit; and outputting the combined position and additional data to the higher-ranking unit. This method substantially corresponds, in particular with regard to its advantages, to the described embodiments of a data provision apparatus in accordance with the invention in which the additional data are brought into a defined relationship with the received position data in that the signal processing unit offsets the received position data and additional data against one another. The possible designs described for these embodiments also apply accordingly to the present method.

A further embodiment of the method in accordance with the invention comprises the following steps: generating a common trigger signal, preferably a time-based trigger signal, by means of a signal processing unit; outputting the common trigger signal in a synchronized manner to a position detection apparatus and an additional data acquisition apparatus; in response to the common trigger signal, acquiring position data by means of the position detection apparatus and acquiring additional data by means of the additional data acquisition apparatus; combining the position data and the additional data for a joint data transmission by means of a signal preparation unit; and outputting the combined position data and additional data to the higher-ranking unit. This method substantially corresponds, in particular with regard to its advantages, to the described embodiments of a data provision apparatus in accordance with the invention in which the additional data are brought into a defined relationship with the received position data in that the signal processing unit generates a common trigger signal for the acquisition of position data and the acquisition of additional data and outputs it in a synchronized manner to the position detection apparatus and to the additional data acquisition apparatus. The possible embodiments described for these embodiments also apply accordingly to the present method.

A further embodiment of the method in accordance with the invention comprises the following steps: acquiring position data by means of a position detection apparatus; generating a position-based trigger signal in dependence on the position data by means of the position detection apparatus or by means of a signal processing unit; outputting the position-based trigger signal to an additional data acquisition apparatus; in response to the position-based trigger signal, acquiring additional data by means of the additional data acquisition apparatus; combining the position data and the additional data for a joint data transmission by means of a signal preparation unit; and outputting the combined position data and additional data to the higher-ranking unit. This method substantially corresponds, in particular with regard to its advantages, to the described embodiments of a data provision apparatus in accordance with the invention in which the additional data are brought into a defined relationship with the received position data in that they are triggered by a position-based trigger signal. The possible designs described for these embodiments also apply accordingly to the present method.

The invention will be explained in more detail in the following only by way of example with reference to the Figures.

Figure 2:
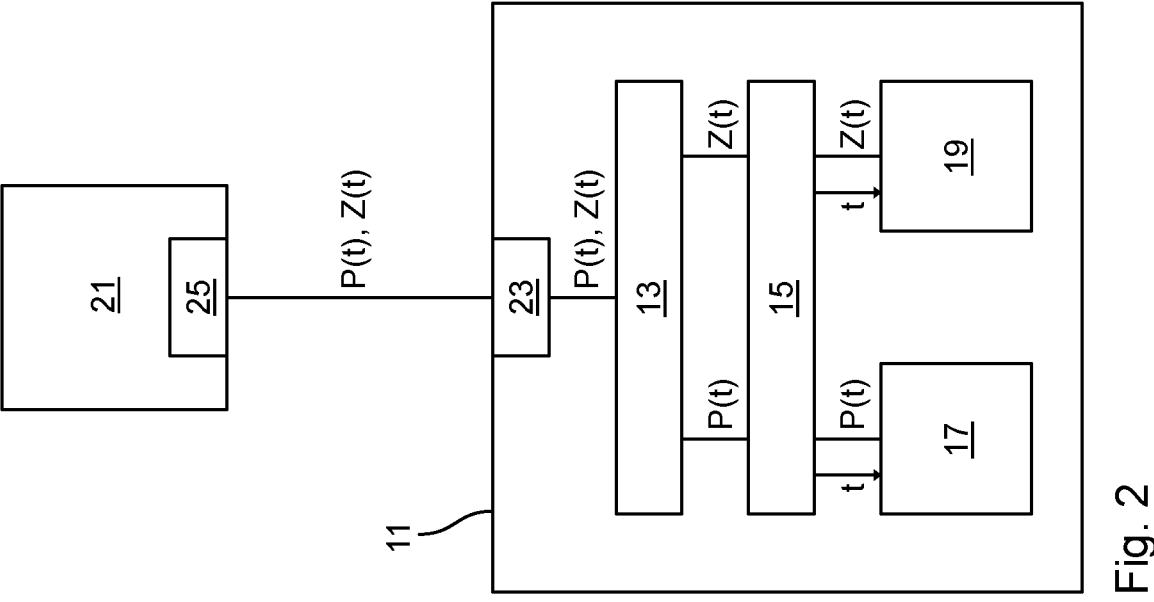
FIG. 2 shows a second embodiment of a data provision apparatus in accordance with the invention.

An embodiment of a data provision apparatus 11 in accordance with the invention is shown in a schematic representation in the Figures. The data provision apparatus 11 in each case comprises a signal preparation unit 13 and a signal processing unit 15. Furthermore, in the embodiments shown, a position detection apparatus 17 and an additional data acquisition apparatus 19 are each shown as components of the data provision apparatus 11. In general, both the position detection apparatus 17 and the additional data acquisition apparatus 19 could each also be configured as apparatus that are separate from the data provision apparatus 11.

The data provision apparatus 11 in each case serves to provide position data P acquired by means of the position detection apparatus 17 and additional data Z acquired by means of the additional data acquisition apparatus 19 to a higher-ranking unit 21. The higher-ranking unit 21 can, for example, be a control or a closed-loop control for a motor (not shown). The position detection apparatus 17 and the additional data acquisition apparatus 19 are in particular configured to acquire position and additional data P and Z, respectively, of this motor. For the transmission of the position and additional data P, Z to the higher-ranking unit 21, the data provision apparatus 11 further in each case comprises a communication interface 23 that can be connected or (as shown in the Figures) is connected to a communication interface 25 of the higher-ranking unit 21.

The embodiments shown further have the common feature that the acquired position data P from the position detection apparatus 17 and the acquired additional data Z from the additional data acquisition apparatus 19 each pass via the signal processing unit 15 to the signal preparation unit 13 and are combined with one another there for a joint data transmission. In a combined form, the position and additional data P, Z are finally output, namely transmitted from the communication interface 23 of the data provision apparatus 11 to the communication interface 25 of the higher-ranking unit 21. The higher-ranking unit 21 can then use the position and additional data P, Z, for example, as part of a motor control.

So that the higher-ranking unit 21 does not first have to offset the position and additional data P, Z against one another before a use in order to bring them into a defined relationship with one another, the additional data Z transmitted to the higher-ranking unit 21 already have a defined relationship with the position data P in the data provision apparatus 11 in accordance with the invention. This is achieved in different ways in the various embodiments, wherein the additional data Z are advantageously brought into a defined relationship with the position data P essentially as early as possible, i.e. close to the acquisition of the additional data Z, in all the cases.

Figure 1:
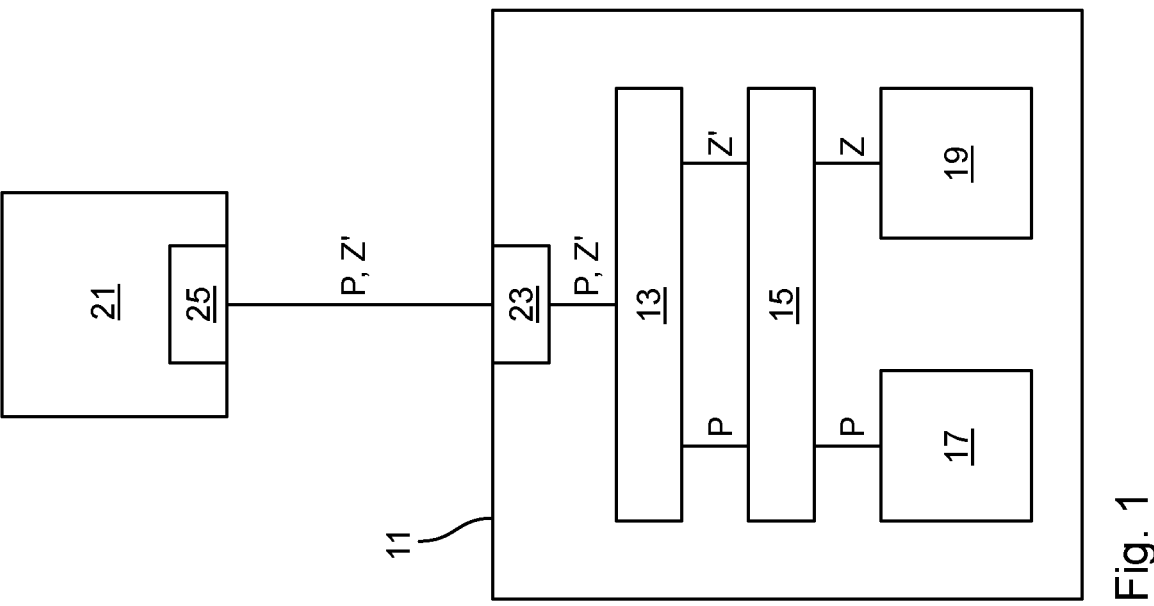
FIG. 1 shows a first embodiment of a data provision apparatus in accordance with the invention.

In the embodiment shown in FIG. 1, this takes place by the signal processing unit 15 offsetting the position data P and the additional data Z, which it receives from the position detection apparatus 17 or the additional data acquisition apparatus 19, against one another. This can in particular comprise the received additional data Z being modified such that they can be unambiguously associated with respective position data P that were, for example, acquired substantially simultaneously or at a defined time interval from the additional data Z. In this regard, the position data P represent the basis for a kind of standardization of the additional data Z. As a result, instead of the additional data Z received from the additional data acquisition apparatus 19, the signal processing unit 15 then outputs additional data Z' that have been modified (namely brought into a defined relationship with the position data P) to the signal preparation unit 13, where they are then combined with the (unmodified) position data P for a joint data transmission. In general, provision could also conversely be made that the position data P, not the additional data Z, are modified by the mentioned offsetting to bring about the defined relationship between the data. Furthermore, it is also possible to modify both the position data P and the additional data Z by the offsetting.

In the embodiment shown in FIG. 2, the defined relationship between the position data P and the additional data Z essentially results from the signal processing unit 15 generating a common time-based trigger signal t that triggers the acquisition of position data P in the position detection apparatus 17 and triggers the acquisition of additional data Z in the additional data acquisition apparatus 19. For this purpose, the signal processing unit 15 outputs the common time-based trigger signal t in a synchronized manner, namely substantially simultaneously or with a defined time offset, to the two acquisition apparatus 17, 19. The position data P(t) and the additional data Z(t), which the signal processing unit 15 receives from the position detection apparatus 17 or the additional data acquisition apparatus 19, then already have a defined temporal relationship with one another due to the synchronized triggering of the respective acquisition by means of the common trigger signal t. The signal processing unit 15 can in particular nevertheless, if necessary, also modify the additional data Z(t) in order, for instance, to explicitly store the existing defined relationship in the data so that the higher-ranking unit 21 can directly determine the defined relationship based on the data. However, such an additional modification is not absolutely necessary. The position data P(t) and additional data Z(t) acquired in dependence on the common trigger signal t are output from the signal processing unit 15 to the signal preparation unit 13 that combines them so that they can finally be jointly transmitted to the higher-ranking unit 21 via the communication interfaces 23 and 25.

Figure 4:
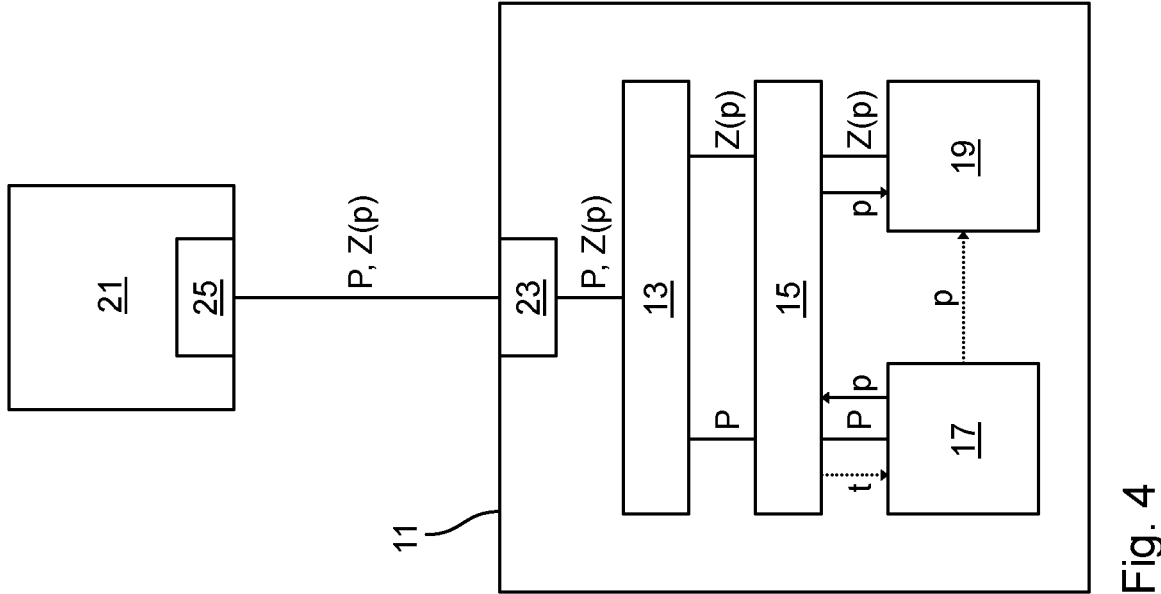
FIG. 4 shows a fourth embodiment of a data provision apparatus in accordance with the invention.
Figure 3:
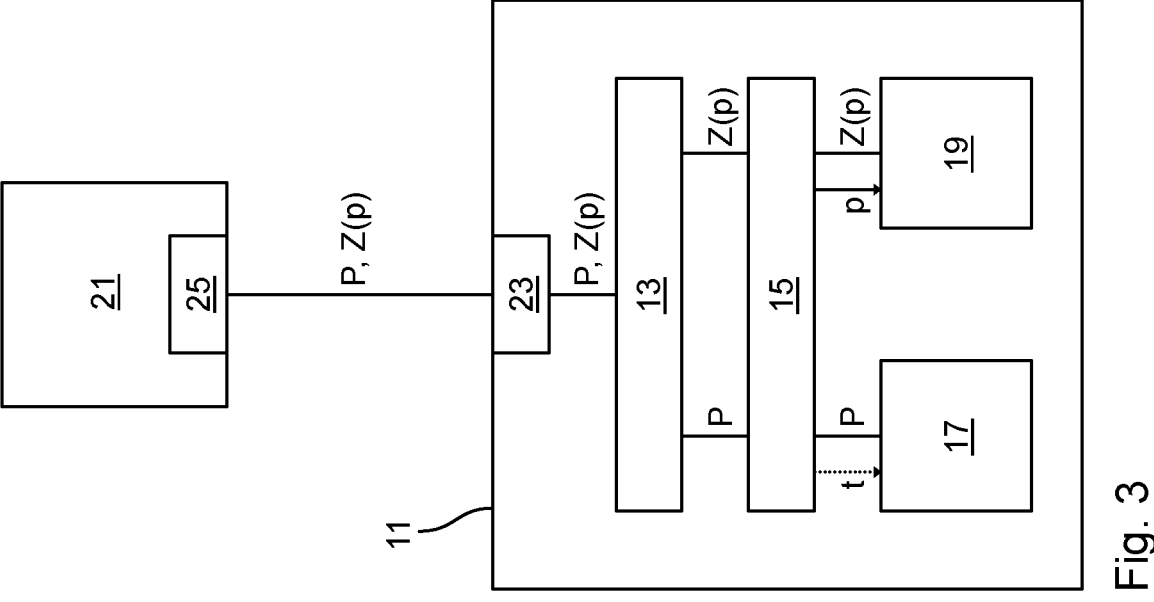
FIG. 3 shows a third embodiment of a data provision apparatus in accordance with the invention.

In the embodiments shown in FIGS. 3 and 4, the acquisition of the additional data Z in the additional data acquisition apparatus 19 is not triggered by a common, time-based trigger signal t, but by a position-based trigger signal p. As is the case in the embodiment shown in FIG. 3, this position-based trigger signal p can be generated by the signal processing unit 15 in dependence on position data P, which said signal processing unit receives from the position detection apparatus 17, and can then be output to the additional data acquisition apparatus 19. For example, the signal processing unit 15 generates a position-based trigger signal p for triggering an acquisition of additional data Z(p) whenever it determines based on the received position data P that the element, for example the motor, whose position is detected has reached a specific position. The additional data Z(p) which the signal processing unit 15 then receives from the additional data acquisition apparatus 19 can thus be associated with this specific position and thereby have a precisely defined relationship with the corresponding position data P. Subsequently, the position data P and the additional data Z(p) are in turn combined by the signal preparation unit 13 for the joint data transmission to the higher-ranking unit 21 and are finally output at the communication interface 23.

Optionally, in addition to the position-based trigger signals p, the signal processing unit 15 can also generate trigger signals t by which the acquisition of position data P is triggered in the position detection apparatus 17 (cf. the dotted arrow in FIG. 3).

The trigger signal t can in particular be a time-based trigger signal that is cyclically generated and output or a trigger signal that is generated and output in response to a request. However, such a trigger signal t is not absolutely necessary since the position detection apparatus 17 can, for example, also be configured to continuously acquire position data P on its own and to output them to the signal processing unit 15.

The embodiment shown in FIG. 4 is very similar to the embodiment shown in FIG. 3. The main difference is that, in the embodiment shown in FIG. 4, the position-based trigger signal p is not generated by the signal processing unit 15, but by the position detection apparatus 17. Again, it can in particular be expedient if the position-based trigger signal p is generated and output whenever a specific position is reached. For this purpose, a corresponding logic can be provided in the position detection apparatus 17. The signal processing unit 15 then does not have to check based on the acquired position data P whether the specific position has been reached and, if necessary, generate the position-based trigger signal p, but can limit itself to receiving the position-based trigger signal p from the position detection apparatus 17 and then outputting it as directly as possible to the additional data acquisition apparatus 19.

Alternatively thereto, provision can also be made that the position detection apparatus 17 outputs the position-based trigger signal p generated by it directly to the additional data acquisition apparatus 19 in order to trigger the acquisition of additional data Z(p) there. This can in particular be expedient if both the position detection apparatus 17 and the additional data acquisition apparatus 19 are integrated into the data provision apparatus 11. The direct output of the position-based trigger signal p from the position detection apparatus 17 to the additional data acquisition apparatus 19 is symbolized by a further dotted arrow in FIG. 4.

It is also conceivable that a single data provision apparatus 11 can be operated in the manner of the embodiment shown in FIG. 2, on the one hand, and in the manner of one of the embodiments shown in FIGS. 3 and 4, on the other hand. In this respect, it can be expedient to make the respective operating mode dependent on acquired position data P, preferably on the respective speed of a motor whose position data P and additional data Z are acquired. For example, provision can be made that, at low speeds below a speed threshold value, the signal processing unit 15 generates a time-based trigger signal t and outputs it in a synchronized manner to the position detection apparatus 17 and to the additional data acquisition apparatus 19 in order to trigger the acquisition of additional data Z(p) and that, at high speeds above the speed threshold value, the acquisition of the additional data Z(p) is instead triggered by means of a position-based trigger signal p that is generated by the signal processing unit 15 or by the position detection apparatus 17 in dependence on the acquired position data P.

Advantageously, in both operating modes, it is in each case achieved that the position and additional data P, Z(p) that are output to the higher-ranking unit 21 do not still have to be offset in the higher-ranking unit 21 in order to be brought into a defined relationship with one another, but already have the defined relationship.

REFERENCE NUMERALS 11 data provision apparatus
13 signal preparation unit
15 signal processing unit
17 position detection apparatus
19 additional data acquisition apparatus
21 higher-ranking unit
23 communication interface
25 communication interface
p position-based trigger signal
t time-based trigger signal
P position data
Z additional data

The invention claimed is:

1. A data provision apparatus (11) for providing position data (P) and additional data (Z) to a higher-ranking unit (21), comprising:
    a signal preparation unit (13) that is configured to receive position data (P) and to receive additional data (Z), and to combine the position data (P) and the additional data (Z) with one another for a joint data transmission and to subsequently output them in a combined form to the higher-ranking unit (21); and a signal processing unit (15) that is configured to:

receive the position data (P) from a position detection apparatus (17) and to receive the additional data (Z) from an additional data acquisition apparatus (19), bring the additional data (Z) into a defined relationship with the position data (P); and subsequently output at least the additional data (Z) to the signal preparation unit (13).

2. The data provision apparatus in accordance with claim 1, wherein the signal processing unit (15) is configured to bring the position data (P) into a defined relationship with the additional data (Z) and to subsequently output said position data (P) to the signal preparation unit (13).

3. The data provision apparatus in accordance with claim 1, wherein the signal processing unit (15) is configured to bring the additional data (Z) into a defined relationship with the received position data (P) in that the signal processing unit (15) offsets the received position data and additional data (P, Z) against one another.

4. The data provision apparatus in accordance with claim 1, wherein the signal processing unit (15) is configured to generate a common trigger signal (t) for the acquisition of position data (P) and the acquisition of additional data (Z) and to output said trigger signal (t) in a synchronized manner to the position detection apparatus (17) and to the additional data acquisition apparatus (19).

5. The data provision apparatus in accordance with claim 4, wherein the signal processing unit (15) is configured to cyclically generate the common trigger signal (t).

6. The data provision apparatus in accordance with claim 1, wherein the signal processing unit (15) is configured to generate a position-based trigger signal (p) in dependence on the received position data (P) and to output the position-based trigger signal (p) to the additional data acquisition apparatus (19).

7. The data provision apparatus in accordance with claim 1, wherein the signal processing unit (15) is configured to receive a position-based trigger signal (p) from the position detection apparatus (17) and to output the position-based trigger signal (p) to the additional data acquisition apparatus (19).

8. The data provision apparatus in accordance with claim 7, wherein the data provision apparatus (11) comprises the position detection apparatus (17) and the position detection apparatus (17) is configured to generate the position-based trigger signal (p) and to output the position-based trigger signal (p) to the signal processing unit (19).

9. The data provision apparatus in accordance with claim 1, wherein the data provision apparatus (11) comprises the position detection apparatus (17) and the position detection apparatus (17) is configured to generate a position-based trigger signal (p) and to output the position-based trigger signal (p) to the additional data acquisition apparatus (19).

10. The data provision apparatus in accordance with claim 1, wherein the data provision apparatus (11) is configured to be selectively operated in a first operating mode, in which time-based trigger signals (t) are generated and are output in a synchronized manner to the position detection apparatus (17) and the additional data acquisition apparatus (19), or in a second operating mode, in which position-based trigger signals (p) are generated in dependence on the position data (P) and are output to the additional data acquisition apparatus (19).

11. The data provision apparatus in accordance with claim 10, wherein the data provision apparatus (11) is configured such that a switch is automatically made between the first and the second operating mode in dependence on acquired position data (P).

12. The data provision apparatus in accordance with claim 1, wherein the data provision apparatus (11) comprises the additional data acquisition apparatus (19) and the additional data acquisition apparatus (19) is configured to acquire vibration data, ultrasound data and/or temperature data as additional data (Z) and to output them to the signal processing unit (15).

13. The data provision apparatus in accordance with claim 1, wherein the data provision apparatus (11) comprises the additional data acquisition apparatus (19) and the additional data acquisition apparatus (19) is configured to read memory values from a memory of the additional data acquisition apparatus (19) as additional data (Z) and to output them to the signal processing unit (15).

14. The data provision apparatus in accordance with claim 1, wherein the data provision apparatus (11) further comprises a communication interface (23) that is connected to a communication interface (25) of the higher-ranking unit (21) and that is configured to receive the combined position and additional data (P, Z) from the signal preparation unit (13) and to transmit them to the higher-ranking unit (21).

15. The data provision apparatus in accordance with claim 1, wherein the defined relationship between the additional data (Z) and the position data (P) comprises a temporal relationship.

16. The data provision apparatus in accordance with claim 2, wherein the defined relationship between the position data (P) and the additional data (Z) comprises a temporal relationship.

17. The data provision apparatus in accordance with claim 3, wherein the signal processing unit (15) calculates additional data (Z) standardized on the basis of the position data (P).

18. A method for providing position data (P) and additional data (Z) to a higher-ranking unit (21), comprising the following steps:

acquiring position data (P) by means of a position detection apparatus (17);

acquiring additional data (Z) by means of an additional data acquisition apparatus (19);

calculating the additional data (Z) in dependence on the position data (P) by means of a signal processing unit (15) such that the additional data (Z) have a defined relationship with the position data (P);

combining the position data (P) and the additional data (Z) for a joint data transmission by means of a signal preparation unit (13); and outputting the combined position and additional data (P, Z) to the higher-ranking unit (21).

19. A method for providing position data (P) and additional data (Z) to a higher-ranking unit (21), comprising the following steps:

generating a common trigger signal (t) by means of a signal processing unit (15);

outputting the common trigger signal (t) in a synchronized manner to a position detection apparatus (17) and an additional data acquisition apparatus (19);

in response to the common trigger signal (t), acquiring position data (P) by means of the position detection apparatus (17) and acquiring additional data (Z) by means of the additional data acquisition apparatus (19);

combining the position data (P) and the additional data (Z) for a joint data transmission by means of a signal preparation unit (13); and outputting the combined position data and additional data (P, Z) to the higher-ranking unit (21).

20. A method for providing position data (P) and additional data (Z) to a higher-ranking unit (21), comprising the following steps:

acquiring position data (P) by means of a position detection apparatus (17);

generating a position-based trigger signal (p) in dependence on the position data (P) by means of the position detection apparatus (17) or by means of a signal processing unit (15);

outputting the position-based trigger signal (p) to an additional data acquisition apparatus (19);

in response to the position-based trigger signal (p), acquiring additional data (Z) by means of the additional data acquisition apparatus (19);

combining the position data (P) and the additional data (Z) for a joint data transmission by means of a signal preparation unit (13); and outputting the combined position data and additional data (P, Z) to the higher-ranking unit (21).

\* \* \* \* \*